Oct. 10, 1944.                A. J. TURPIN ET AL                2,360,178
                            FLUID PRESSURE REGULATOR
                               Filed Feb. 6, 1943

INVENTORS
ALEXANDER J. TURPIN AND
ALFRED F. SCHUMANN
BY
ATTORNEY.

Patented Oct. 10, 1944

2,360,178

UNITED STATES PATENT OFFICE 2,360,178

FLUID PRESSURE REGULATOR

Alexander J. Turpin, Stewart Manor, N. Y., and Alfred F. Schumann, Lower Merion, Pa., assignors to Hauck Manufacturing Company, Brooklyn, N. Y., a corporation of New York Application February 6, 1943, Serial No. 474,964

5 Claims. (Cl. 50—23)

The invention relates to pressure regulator means, more especially of the type designed for regulating pressure of fluids to be supplied in extremely small volumes. In devices of this type wherein the flow per hour may have a range of only 1 to 7 quarts of oil, for example, it is very difficult to secure accurate control of the pressure of the discharged fluid; and it is an object of the present invention to provide a novel regulator whereby a continued and accurate control of fluid passing therethrough is afforded.

A further object of the invention is to provide an extremely small port through which the fluid flows and is controlled, the invention contemplating the elimination of the passage of any valve-operating stem through such port tending to obstruct the same.

Still another object of the invention is to provide a mounting for the valve stem controlling the port which will accommodate itself to distortions of an operating diaphragm for actuating the valve.

The invention has for an object, also, a construction of regulator which will allow of ready access for the convenient removal of the valve port and seat as for repair or replacement without disturbing the other parts of the assembly.

Another object of the invention is to provide a construction of such regulator which will admit of convenient association therewith of a pressure-measuring instrument for determining the pressure of the discharge fluid.

In carrying out the invention, a valve body with opening at top and bottom affords a suitable chamber having an inlet connection controlled by a valve and an outlet connection in direct communication with the chamber. The said top opening is designed to be closed by a removable cover which may bear also a pressure gauge having connection therethrough to the interior of the chamber. The inlet to this chamber terminates in a valve seat which is preferably provided as a separate and removable element serving also as a guide for the valve stem having a valve piece designed to coact with said seat in controlling the flow between the inlet and outlet connections.

A second casing is associated with the valve body and is designed, together with a diaphragm member, to seal the lower opening thereof. The said second casing houses an adjustable resilient member, for example, in the nature of a coiled spring which is designed to bear upon the diaphragm to urge the same in the direction of the said valve chamber. In addition, the diaphragm has secured thereto to be movable therewith a head to which is pivoted a yoke member with the head extending over the valve seat, said latter head being provided with a perforation and radially slotted mouth extending therefrom outwardly to the edge of the said latter head. Swing of the yoke in one direction is limited as by contact with a finger or stop element depending from the underside of the cover but allowing of sufficient play for free operation of a valve stem. This valve stem is designed to be suspended from the head of the yoke through a portion of reduced cross-section which is designed to engage in the perforation of the head, so that as the yoke partakes of the regulating movement of the diaphragm the valve stem will be lifted more or less off its coacting seat to effect the desired regulation.

Upon removal of the cover closing the top opening of the valve body, the yoke may be swung away from the valve stem to clear the same so that it can be lifted out of the guide member which is also free for removal.

The nature of the invention, however, will best be understood when described in connection with the accompanying drawing, in which.

Figure 1:
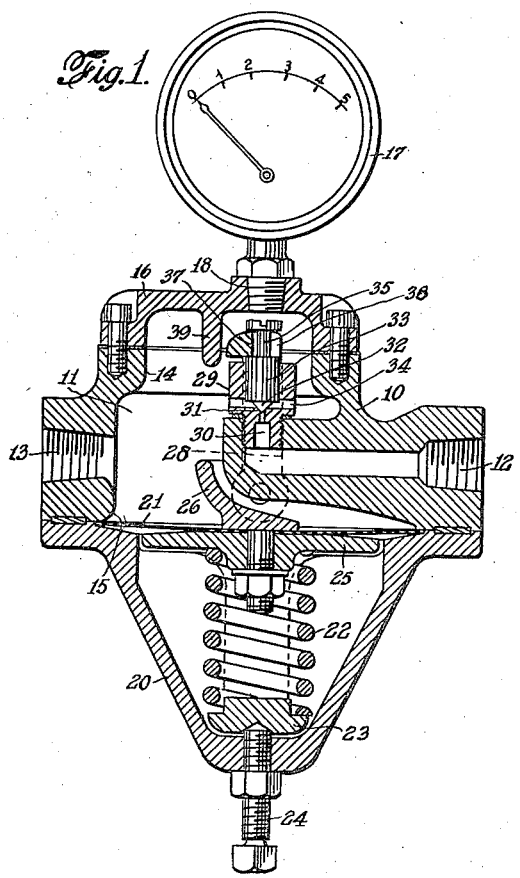
Fig. 1 is a longitudinal section of the novel pressure regulator with associated pressure gauge shown in elevation.
Figure 2:
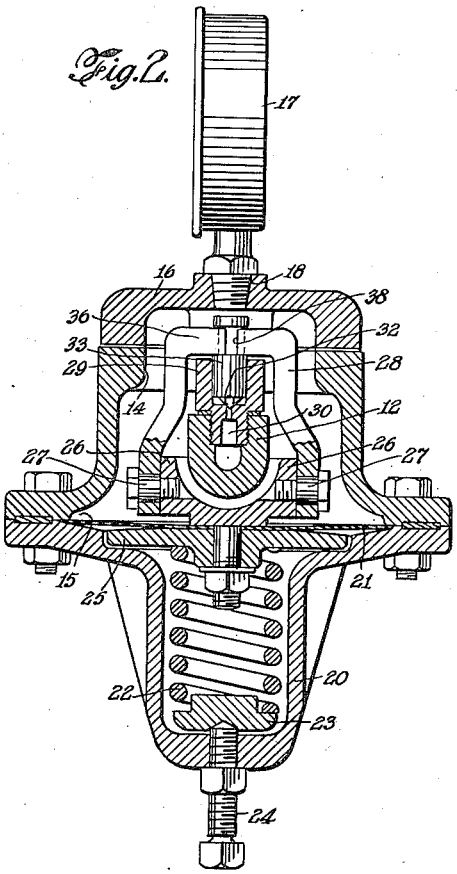
Fig. 2 is a similar transverse section thereof.
Figure 3:
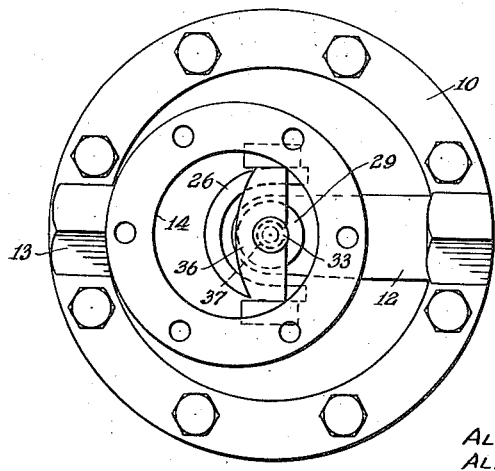
Fig. 3 is a plan view of the regulator with cover member and pressure gauge removed.

Referring to the drawing, 10 designates a valve body affording a chamber 11 having an inlet connection 12 designed to be placed in communication therewith in a manner hereinafter set forth. A direct outlet connection 13 is made to said chamber, and the former connection is designed for communication with a source of fluid supply, either gaseous or liquid, for example oil, while the latter connection is designed to supply the fluid for use and under a substantially constant and predetermined pressure. To this end, provision is made for controlling the discharge of the fluid from the inlet into the chamber 11 which has further respective upper and lower openings 14 and 15 designed normally to be closed as follows. Opening 14 is provided with a removable cover member 16 which carries also a pressure gauge 17 for measuring the pressure of the fluid in chamber 11, having for this purpose a connection 18 thereto through the cover 16 and into an air dome or pocket which develops in the upper portion of chamber 11.

A second casing 20, together with a flexible diaphragm element 21, is designed to seal chamber 11 at the opposite opening 15, and provision is made for exerting a predetermined but adjustable inward pressure thereon, for example, by means of a coiled expansion spring 22 mounted in the casing 20 and having its one end bearing against a head 23 which is designed to receive the inner end of an adjustment screw 24 threaded through the bottom of casing 20 to compress the spring 22 an amount necessary to secure the desired pressure upon the diaphragm 21. The other end of the spring 22 bears against one half of a head 25 between which and the other half 26 of said head is secured the said diaphragm 21 substantially at its center.

The portion 26 of the diaphragm head, also, is designed to afford pivotal connections 27 for the respective arm elements of a yoke member 28 which extends upwardly into the valve chamber about the inner end of the inlet connection 12. This inner end of the said connection affords a valve seat for discharge of fluid into the chamber 11; and the same is preferably provided by a stud 29 which may be screwed into the inner end of said connection and has a port 30 communicating therewith. Said port terminates in a conical surface depression 31 affording the seat for cooperation with a valve piece 32 carried by a stem 33. Oppositely directed radial ports 34 extending through an upward extension and guide for the valve stem and juxtaposed to the surface of the seat serve as outlets for any fluid passing between the valve piece and seat.

The valve stem 33 carrying the valve piece 32 passes upwardly through the cylindrical bore of the guide portion of the stud 29 and then is reduced in cross-section as at the intermediate portion 35 to fit within a head 36 at the upper end of the yoke, said head being extended laterally over the stud 29 and provided with a perforation 37 and an outwardly-extending, narrower radial slot or mouth 38 through which said reduced section 35 may pass in assembling the valve elements. Head 36 of the yoke thus embraces the reduced section 35 retaining the valve stem to the said yoke yet allowing a slight reciprocation and sufficient play with respect thereto to accommodate irregularities in deflection of the diaphragm 21 during operation. Movement of the said head 36 laterally in a direction opposite to the mouth thereof is limited by means of a stop or finger 39 which depends from the inner surface of the cover 16.

The mounting hereinbefore described of the valve stem in the yoke provides for convenient removal and/or replacement of the valve stem should this become necessary, or in case it is desider to grind the valve seat. Thus, it is necessary merely to remove the cover 16 and swing backwardly the yoke to clear the said stem which may then be lifted out of guide stud 29. This guide and seat member may then also be removed, if desired, as by unscrewing it from the inlet connection 12.

We claim:

1. A fluid pressure regulating valve, comprising a valve body having an upper and a lower opening, and an inlet and an outlet connection, the former terminating within the body in a valve seat with a port therethrough, said body providing a chamber in communication directly with the outlet and with the inlet through said port, a removable cover casing closing the upper opening, a second casing removably secured to the body portion, together with an intermediate flexible diaphragm sealing the said lower opening of the valve body and located intermediate the same and said second casing, adjustable resilient means mounted within the second casing urging said diaphragm toward the chamber, a head carried by the diaphragm within the valve chamber to move therewith, a yoke pivoted to said head extending upwardly therefrom into the chamber upon opposite sides of the inlet connection and above the valve seat thereof, and a valve stem bearing a valve piece adapted to fit the valve seat, together with means on the stem engaging the top of the yoke to cause through the latter movement of said stem relatively to the seat, said yoke having a lateral through opening to pass the stem for disengagement therewith upon rocking the yoke.

2. A fluid pressure regulating valve, comprising a valve body having an upper and a lower opening, and an inlet and an outlet connection, the former terminating within the body in a valve seat with a port therethrough, said body providing a chamber in communication directly with the outlet and with the inlet through said port, a removable cover casing closing the upper opening, a second casing removably secured to the body portion, together with an intermediate flexible diaphragm sealing the said lower opening of the valve body and located intermediate the same and said second casing, adjustable resilient means mounted within the second casing urging said diaphragm toward the chamber, a head carried by the diaphragm within the valve chamber to move therewith, a yoke pivoted to said head extending upwardly therefrom into the chamber upon opposite sides of the inlet connection and above the valve seat thereof, a stop extending inwardly from the cover casing to limit the swing of said yoke in one direction, and a valve stem bearing a valve piece adapted to fit the valve seat, said stem being carried by the top of the yoke and the top having a radial outlet slot to pass the stem upon swinging said yoke angularly relatively to said stem.

3. A fluid pressure regulating valve, comprising a valve body having an upper and a lower opening, and an inlet and an outlet connection, the former terminating within the body in a valve seat with a port therethrough, said body providing a chamber in communication directly with the outlet and with the inlet through said port, a removable cover casing closing the upper opening, a second casing removably secured to the body portion, together with an intermediate flexible diaphragm sealing the said lower opening of the valve body and located intermediate the same and said second casing, adjustable resilient means mounted within the second casing urging said diaphragm toward the chamber, a head carried by the diaphragm within the valve chamber to move therewith, a yoke pivoted to said head extending upwardly therefrom into the chamber upon opposite sides of the inlet connection and above the valve seat thereof, and a valve stem bearing a valve piece adapted to fit the valve seat and the upper end of said yoke having a perforated head, the perforation communicating laterally with an outlet slot of a width to pass freely the stem for its disengagement with the yoke upon swinging the latter angularly relatively to said stem, the latter extending normally through the perforation of the head and provided with an enlargement at its outer end designed to rest upon the said head and with an enlargement below the head to shoulder therewith.

4. A fluid pressure regulating valve, comprising a valve body having an upper and a lower opening, and an inlet and an outlet connection, a stud screwed into the inner end of the inlet connection to provide a valve seat with a port, said body providing a chamber in communication directly with the outlet and with the inlet through said port, a removable cover casing closing the upper opening, a second casing removably secured to the body portion, together with an intermediate flexible diaphragm sealing the said lower opening of the valve body and located intermediate the same and said second casing, adjustable resilient means mounted within the second casing urging said diaphragm toward the chamber, a head carried by the diaphragm within the valve chamber to move therewith, a yoke pivoted to said head and extending upwardly therefrom into the chamber upon opposite sides of the inlet connection and above the valve seat thereof, a valve stem bearing a valve piece adapted to fit the valve seat and the upper end of said yoke having a perforated head, the perforation communicating laterally with an outlet slot of a width to pass freely the stem for its disengagement with the yoke upon swinging the latter angularly relatively to said stem, the latter extending normally through the perforation of the head and provided with an enlargement at its outer end designed to rest upon the said head and with an enlargement below the head to shoulder therewith, and guide means for the valve stem located intermediate the inlet connection and the head of the yoke.

5. A fluid pressure regulating valve, comprising a valve body having an upper and a lower opening, and an inlet and an outlet connection, a stud screwed into the inner end of the inlet connection to provide a valve seat with a port, said stud having an upward and longitudinally bored extension, said body providing a chamber in communication directly with the outlet and with the inlet through said port, a removable cover casing closing the upper opening, a second casing removably secured to the body portion, together with an intermediate flexible diaphragm sealing the said lower opening of the valve body and located intermediate the same and said second casing, adjustable resilient means mounted within the second casing urging said diaphragm toward the chamber, a head carried by the diaphragm within the valve chamber to move therewith, a yoke pivoted to said head extending upwardly therefrom into the chamber upon opposite sides of the inlet connection and above the valve seat thereof, a valve stem bearing a valve piece adapted to fit the valve seat and the upper end of said yoke having a perforated head, the perforation communicating laterally with an outlet slot of a width to pass freely the stem for its disengagement with the yoke upon swinging the latter angularly relatively to said stem, the latter extending normally through the perforation of the head and provided with an enlargement at its outer end designed to rest upon the said head and with an enlargement below the head to shoulder therewith, said second enlargement fitting loosely the bore of the said stud.

ALEXANDER J. TURPIN.
ALFRED F. SCHUMANN.